United States Patent [19]
Yokoe et al.

[11] Patent Number: 5,255,198
[45] Date of Patent: Oct. 19, 1993

[54] EMBROIDERY DATA PROCESSING APPARATUS

[75] Inventors: Masaaki Yokoe, Nagoya; Hideo Kawaguchi, Tajimi, both of Japan

[73] Assignee: Brother Kogyo Kabushiki Kaisha, Aichi, Japan

[21] Appl. No.: 653,298

[22] Filed: Feb. 11, 1991

[30] Foreign Application Priority Data

Feb. 21, 1990 [JP] Japan .................... 2-40691

[51] Int. Cl.$^5$ .................................... G06F 15/46
[52] U.S. Cl. .................... 364/470; 112/103; 112/121.12
[58] Field of Search ............ 364/470; 112/121.11, 112/121.12, 103, 456, 266.1

[56] References Cited

U.S. PATENT DOCUMENTS

| | | | |
|---|---|---|---|
| 4,352,334 | 10/1982 | Childs et al. | 112/103 |
| 4,385,570 | 5/1983 | Yanagi | 112/121.12 |
| 4,388,883 | 6/1983 | Hirota et al. | |
| 4,499,838 | 2/1985 | Voza | 112/456 |
| 4,520,745 | 6/1985 | Shinomoya et al. | 112/121.12 |
| 4,742,786 | 5/1988 | Hashimoto et al. | 112/121.12 |
| 4,781,130 | 11/1988 | Badowski | 112/121.12 |
| 5,005,500 | 4/1991 | Kato et al. | 364/470 |

Primary Examiner—Jerry Smith
Assistant Examiner—Jim Trammell
Attorney, Agent, or Firm—Oliff & Berridge

[57] ABSTRACT

An apparatus for processing embroidery data necessary for a sewing machine to form an embroidery in an area by filling the embroidery area with stitches, including a storing device storing outline data representing an outline of an embroidery area which outline includes a curved line portion, the outline data including curved line data defining the curved line portion, the curved line data including data indicative of a characteristic of the curved line portion, and a producing device producing the embroidery data by utilizing the outline data. The apparatus may further include a modifying device modifying the outline data and thereby transforming the outline. In this case, the producing device produces, by utilizing the modified outline data representing the transformed outline, embroidery data necessary to form an embroidery inside the transformed outline.

19 Claims, 10 Drawing Sheets

EMBROIDERY DATA PROCESSING APPARATUS

BACKGROUND OF THE INVENTION

1. Field Of The Invention

The present invention relates to an apparatus for processing embroidery data necessary for a sewing machine to form an embroidery in an area by filling the embroidery area with stitches.

2. Related Art Statement

There is known an embroidery data processing device of a type which has (a) block data storing means and (b) stitch position data producing means. The block data storing means stores sets of block data each representative of a corresponding one of elementary blocks in an embroidery area for an embroidery such as letters, numerics, and symbols, which blocks are arranged in an embroidering direction in which the filling of each block with stitches is advanced. The stitch position data producing means produces, by utilizing the block data stored in the storing means and, in addition, data indicative of a stitch density selected by an operator, sets of stitch position data indicative of respective stitch positions at which a sewing needle pierces a workfabric to form the stitches.

Generally, an elementary block is defined or enclosed by four line segments. In other words, the outline of an elementary block consists of four line segments. Blocks are classified into two types, one of which is a quadrangular type whose outline consists of straight line segments and the other of which is a curvilinear type whose outline consists of line segments including at least one curved line segment. Regarding an embroidery area illustrated in FIG. 11, a quadrangular block approximates a part of the embroidery area which part is defined by, and between, two curved line segments each belonging to the outline of the area. More specifically described, a pair of opposite sides of the quadrangular block approximate corresponding curved line segments of the outline, respectively. In the meantime, regarding an embroidery area of FIG. 12, a curvilinear block is defined by, and between, two curved line segments each belonging to the outline of the embroidery area, that is, the curvilinear block has the two curved line segments as a pair of opposed line segments thereof. The curvilinear block represents with fidelity a part of the area which part is defined between the two curved line segments.

Generally, block data representative of a quadrangular block consists of sets of position data each indicative of the position of a corresponding one of vertices of the block.

The embroidery data processing device of the above indicated type is adapted to store block data for quadrangular blocks. Therefore, a great number of rectilinear blocks, or, division base points as vertices of those blocks are needed for accurately approximating the outline. Consequently, the block data storing means of the device is required to have a large storage capacity.

The above device suffers from another problem. For storing block data for quadrangular blocks arranged in an embroidering direction in an embroidery area, it is required to divide each of two portions of the outline which portions are opposed to each other generally in a direction perpendicular to the embroidering direction, into the same number of straight line segments which cooperate with each other to approximate a corresponding one of the opposed portions of the outline. The embroidery area is filled with stitches formed by alternately connecting with thread between the opposed portions in the embroidering direction, so that an embroidery is produced in the area. However, the degree of approximation for one of the opposed portions of the outline will be more or less different from that for the other portion, and therefore an excessively high degree of approximation will be given for one of the opposed portions of the outline. For this reason, too, the block data storing means of the device needs a great storage capacity. This problem will be described in more detail by reference to examples illustrated in FIGS. 13 and 14, in which a letter "O" is embroidered on a workfabric.

FIGS. 13 and 14 each show the same part of letter "O", which part includes two curved line portions belonging to an inner and an outer closed line, respectively, which lines constitute the outline of the letter. As described above, for dividing letter "O" into quadrangular blocks, it is required to divide each of the inner and outer closed lines into the same number of straight line segments which approximates a corresponding one of the two closed lines. However, in such a case, the degree of approximation for one of the inner and outer closed lines will be different from that for the other closed line. In the meantime, if each of the two closed lines is divided into straight line segments of the same length for the purpose of giving substantially the same degree of approximation for the each closed line, the number of the straight line segments for the outer closed line will be greater than that for the inner closed line, because an overall length of the outer closed line is longer than that of the inner closed line. Consequently, some of the points determined on the outer closed line for the purpose of dividing letter "O" do not find corresponding points on the inner closed line. The quadrangular blocks obtained in this way suffer from inappropriate profiles or shapes largely deviated from ideal, quadrangular shapes in which stitches are advantageously formed with uniform stitch density. Thus, it is difficult to divide letter "O" into quadrangular blocks while simultaneously giving the same degree of approximation for each of the outer and inner closed lines.

As is apparent, from the foregoing, for dividing letter "O" into quadrangular blocks, it is required to divide each of the inner and outer closed lines into the same number of straight line segments, by sacrificing the requirement of giving the same degree of approximation for each closed line. In this case, the inner closed line is divided into straight line segments of excessively short lengths, namely, excessively high approximation degrees, as shown in FIG. 14.

In short, in the event that the above indicated processing device stores block data for letter "O", it is required to divide each of the outer and inner closed lines of the outline into the same number of straight line segments, although such division is not needed for achieving the purpose of giving the same degree of approximation for each closed line. Consequently, an excessively large number of blocks are derived from letter "O", and therefore the storing means is required to have an excessively large storage capacity capable of storing block data for such a large number of blocks.

There is known another embroidery data processing device capable of transforming the figure of outline of an embroidery or embroidery area. The transformation is, for example, magnification, contraction, or rotation.

The processing device includes (1) block data storing means for storing block data (hereinafter, referred to as original block data) which represent quadrangular blocks in an embroidery area, for example, in normal size, (2) modifying means for modifying the original block data and thereby transforming the quadrangular blocks, and (3) producing means for producing, by utilizing the modified block data representing the transformed quadrangular blocks, embroidery data necessary to fill with stitches each of the transformed blocks.

In the event that the modifying means of the above indicated, second processing device modifies original block data for quadrangular blocks approximating a part of an embroidery area which part is defined by, and between, two curved line portions of the outline which portions are opposed to each other on the outline, straight line segments (sides of the quadrangular blocks) approximating the curved line portions are subjected to transformation such as magnification. If the original block data is so modified as to magnify the quadrangular blocks by a ratio or rate selected by an operator, the modified block data result in forming an embroidery which suffers from undesirable burrs or indentations along the magnified outline. As the rate of magnification is increased, the amount of offset between the curved line segments and the straight line segments approximating the curved line segments, is increased. It will eventually be recognized by the naked eye that the outline of the embroidery is approximated by the straight line segments.

SUMMARY OF THE INVENTION

It is therefore an object of the present invention to provide an embroidery data processing apparatus which has the least possible storage capacity for storing data representing the outline of an embroidery.

According to a first aspect of the present invention, there is provided an apparatus for processing embroidery data necessary for a sewing machine to form an embroidery in an area by filling the embroidery area with stitches, comprising storing means for storing outline data representing an outline of an embroidery area which outline includes a curved line portion, the outline data including curved line data defining the curved line portion, the curved line data including data indicative of a characteristic of the curved line portion, and producing means for producing the embroidery data by utilizing the outline data.

In the embroidery data processing apparatus constructed as described above, the storing means stores outline data representing an outline of an embroidery area which outline includes a curved line portion, such that the outline data include curved line data defining the curved line portion and the curved line data include data indicative of a characteristic of the curved line portion. The curved line data do not represent the curved line portion by utilizing one or more straight line segments approximating the curved line portion, but defines with fidelity the curved line portion as it is. According to the principle of the present invention, it is not required to divide the embroidery area into elementary blocks, either quadrangular or curvilinear, although the area may be divided into blocks for additional purposes. The amount of the curved line data is small for its fidelity of representation of the outline of the embroidery.

In a preferred embodiment according to the first aspect of the present invention, the curved line portion consists of at least one curved line segment, and the curved line data defines each of the at least one segment and include data indicative of a characteristic of the each curved line segment. The curved line data may include data indicative of a pair of end points of the each curved line segment, and a function which cooperates with the end points to define an arbitrary point on the each segment. In this case, the storing means is required to store only a small amount of data for the end points of each curved line segment, in addition to the function.

The above function may be a third-order Bezier curve function which utilizes the two end points of the each curved line segment and two control points for defining the arbitrary point on the each segment. Alternatively, the function may be selected from spline curve function, n-th order curve function, circular function, and elliptic function. A single function may be used commonly for different embroiders. It goes without saying that different functions may be used for different embroiders.

In another embodiment according to the first aspect of the present invention, the producing means comprises means for dividing a part of the embroidery area which part is defined by, and between, the curved line portion and a line portion of the outline which is opposed to the curved line portion, into a plurality of first blocks each of which is a curvilinear block defined by, and between, corresponding line segments which belong to the curved line portion and the opposed line portion, respectively, and producing sets of first block data each of which represents the outline of a corresponding one of the first blocks, and means for dividing each of the first, curvilinear blocks into a plurality of second blocks each of which is a quadrangular block defined by, and between, two straight line segments and which blocks cooperate with each other to approximate the each first curvilinear block, and producing sets of second block data each of which represents the outline of a corresponding one of the second blocks. The first blocks may be derived from the embroidery area, by utilizing the at least one curved line segment belonging to the curved line portion, or alternatively, irrespective of the at least one curved line segment. The producing means may further comprise means for producing, by utilizing the second block data, sets of stitch position data indicative of respective stitch positions at which the sewing machine forms the stitches to fill each of the second blocks. In this case, data indicative of a stitch density may be utilized. Thus, the embroidery data may consist of block data, or alternatively, stitch position data. The producing means may be adapted to produce stitch position data directly from the outline data and data indicative of a stitch density.

According to a second aspect of the present invention, there is provided an apparatus for processing embroidery data necessary for a sewing machine to form an embroidery in an area by filling the embroidery area with stitches, comprising storing means for storing outline data representing an outline of an embroidery area which outline includes a curved line portion, the outline data including curved line data defining the curved line portion, the curved line data including data indicative of a characteristic of the curved line portion, modifying means for modifying the outline data and thereby transforming the outline, and producing means for producing, by utilizing the modified outline data representing the transformed outline, embroidery data necessary to form an embroidery inside the transformed outline.

In the processing apparatus constructed according to the second aspect of the present invention, the modifying means modifies the outline data so as to transform the outline, and the producing means produces, by utilizing the modified outline data representing the transformed outline, embroidery data appropriate to form an embroidery inside the transformed outline. The modifying means does not subject to transformation one or more straight line segments approximating the curved line portion of the outline, but the curved line portion itself. Therefore, this apparatus provides, in addition to advantages similar to those of the apparatus according to the first aspect of the invention, the advantage of freedom from inappropriate burrs or indentations along the outline of the produced embroidery which have been encountered as a result of transformation, which advantage leads to providing the embroidery with excellent appearance or quality.

In a preferred embodiment according to the second aspect of the present invention, the modifying means modifies the outline data so that the outline is subjected to at least one of magnification, contraction, rotation, and parallel translation.

In another embodiment according to the second aspect of the present invention, the modifying means modifies coordinates of each of the two end points and two control points of the each curved line segment.

BRIEF DESCRIPTION OF THE DRAWINGS

The above and optional objects, features and advantages of the present invention will be better understood by reading the following detail description of the presently preferred embodiment of the invention when considered in conjunction with the accompanying drawings, in which.

DETAILED DESCRIPTION OF THE PREFERRED EMBODIMENT

Figure 1:
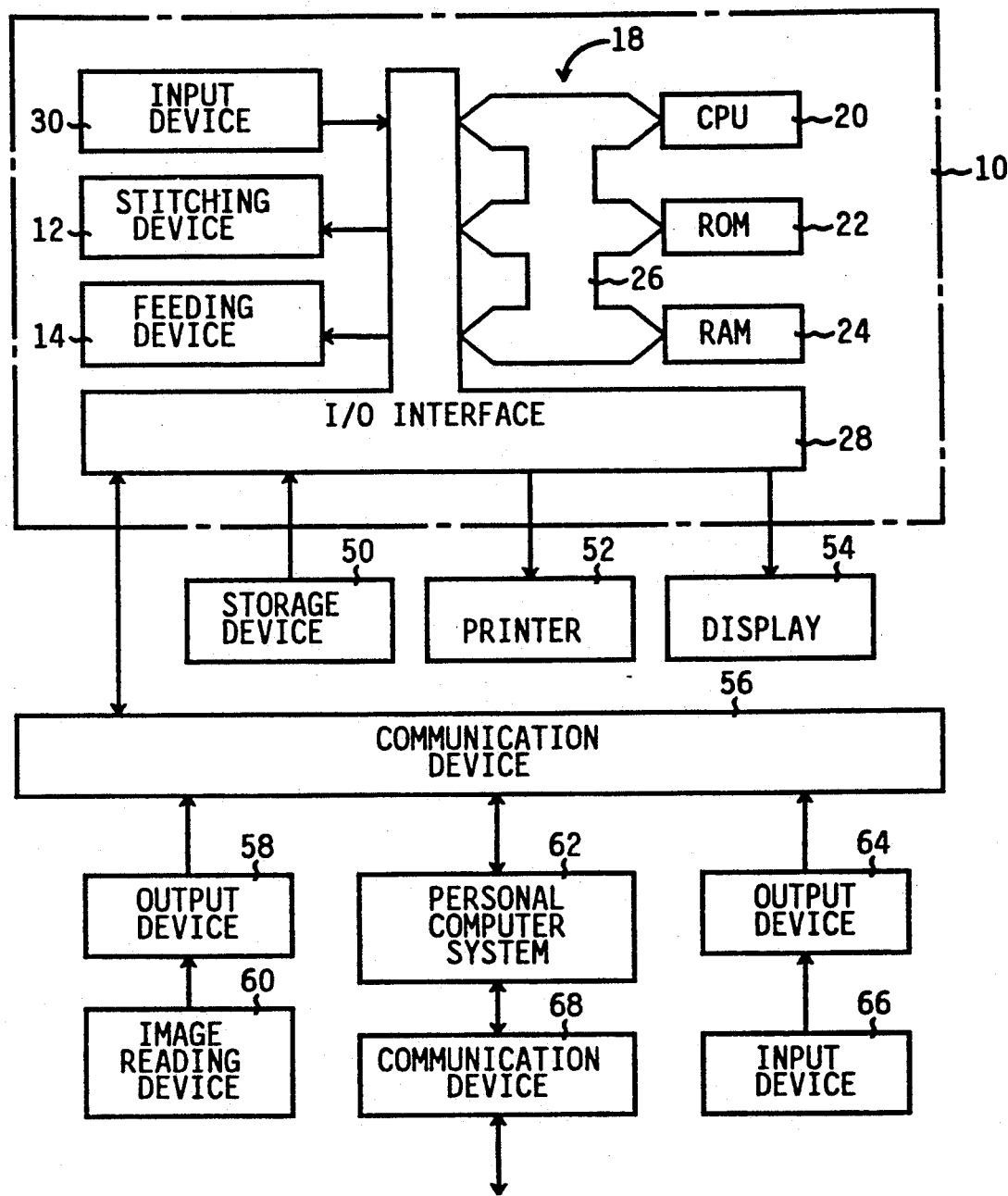
FIG. 1 is a diagrammatic view of an embroidery sewing machine system embodying the present invention.

Referring first to FIG. 1, there is illustrated an embroidery sewing system 10 embodying the present invention. The sewing system 10 has the function of transforming a figure of outline of an embroidery area in which the sewing system 10 forms an embroidery by filling with stitches.

As shown in FIG. 1, the sewing system 10 includes a stitching device 12, a feeding device 14, and a computer 18. The stitching device 12 includes a sewing needle, an electric motor, etc. The feeding device 14 includes means for holding a workfabric on which an embroidery is formed, and means for feeding the workfabric in a plane substantially perpendicular to a direction of movement of the sewing needle. The computer 18 controls both the stitching device 12 and the feeding device 14.

The computer 18 is constituted by a central processing unit (CPU) 20, a read only memory (ROM) 22, a random access memory (RAM) 24, a bus 26, an input-/output (I/O) interface 28, etc. The stitching device 12 and the feeding device 14 each are connected to the I/O interface 28. In addition, an input device 30 is connected to the I/O interface 28. The input device 30 has various keys which are operated by an operator. The ROM 22 stores various control programs including an embroidering control program represented by the flow chart of FIG. 2. As shown in FIG. 3, the RAM 24 includes original outline data memory 34, figure transformation data memory 36, modified outline data memory 38, block data memory 40, stitch position data memory 42, segment correspondence data memory 44, and stitch density data memory 44.

The sewing system 10 is connected to various external devices via the I/O interface 28. The external devices include a storage device 50 such as a floppy disk drive, a printer 52 such as a plotter, and a display 54 such as a cathode ray tube (CRT). The external storage device 50 stores one or more sets of original outline data each of which represents the figure of outline of a corresponding one of one or more embroideries or embroidery areas. Alphabetics and numerics are examples of the embroideries. The outline of an embroidery or embroidery area is constituted by one or more closed lines. In addition, the storage device 50 stores sets of segment correspondence data (described later) associated with each original outline data.

Figure 4:
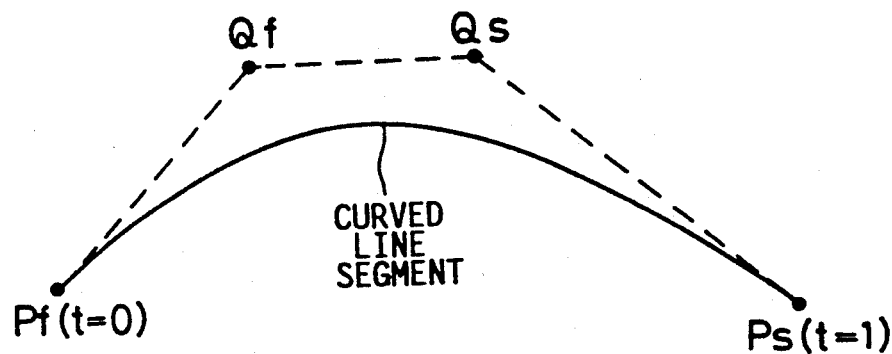
FIG. 4 is a view for explaining cubic Bezier curve function used in the system.

In the event, for example, that the outline of an embroidery area consists of a combination of a single straight line portion and a single curved line portion, the original outline data representing the outline includes straight line data representing the straight line portion, and curved line data representing or defining the curved line portion. The curved line data include data indicative of a characteristic of the curved line portion. In the present embodiment, each of one or more straight line portions belonging to the outline of an embroidery area is dealt with such that the each straight line portion consists of a single straight line segment, while each of one or more curved line portions belonging to the outline of an embroidery area is dealt with such that the each curved line portion consists of one or more curved line segments. The curved outline data representing the each curved outline portion define each of the one or more curved line segments, and include data indicative of a characteristic of the each curved line segment. In the present embodiment, each curved line segment is defined by a cubic Bezier curve function. As shown in FIG. 4, a curved line segment or cubic Bezier curve is defined by two points which are two end points of the curved line segment, namely, start and end points $P_f$ ($P_{fx}$, $P_{fy}$) and $P_s$($P_{sx}$, $P_{sy}$), first and second control points $Q_f$($Q_{fx}$, $Q_{fy}$) and $Q_s$ ($Q_{sx}$, $Q_{sy}$), and the following expressions (1):

$$P_x(t)=(1-t)^3 P_{fx}+3(1-t)^2 t Q_{fx}+3(1-t)t^2 Q_{sx}+t^3 P_{sx}$$

$$P_y(t)=(1-t)^3 P_{fy}+3(1-t)^2 t Q_{fy}+3(1-t)t^2 Q_{sy}+t^3 P_{sy}, \quad (1)$$

where $0 \leq t \leq 1$; t is a parameter. Coordinates ($P_x$, $P_y$) of an arbitrary point on the Bezier curve is specified by replacing parameter t by an appropriate value from zero to one inclusive.

Figure 5:
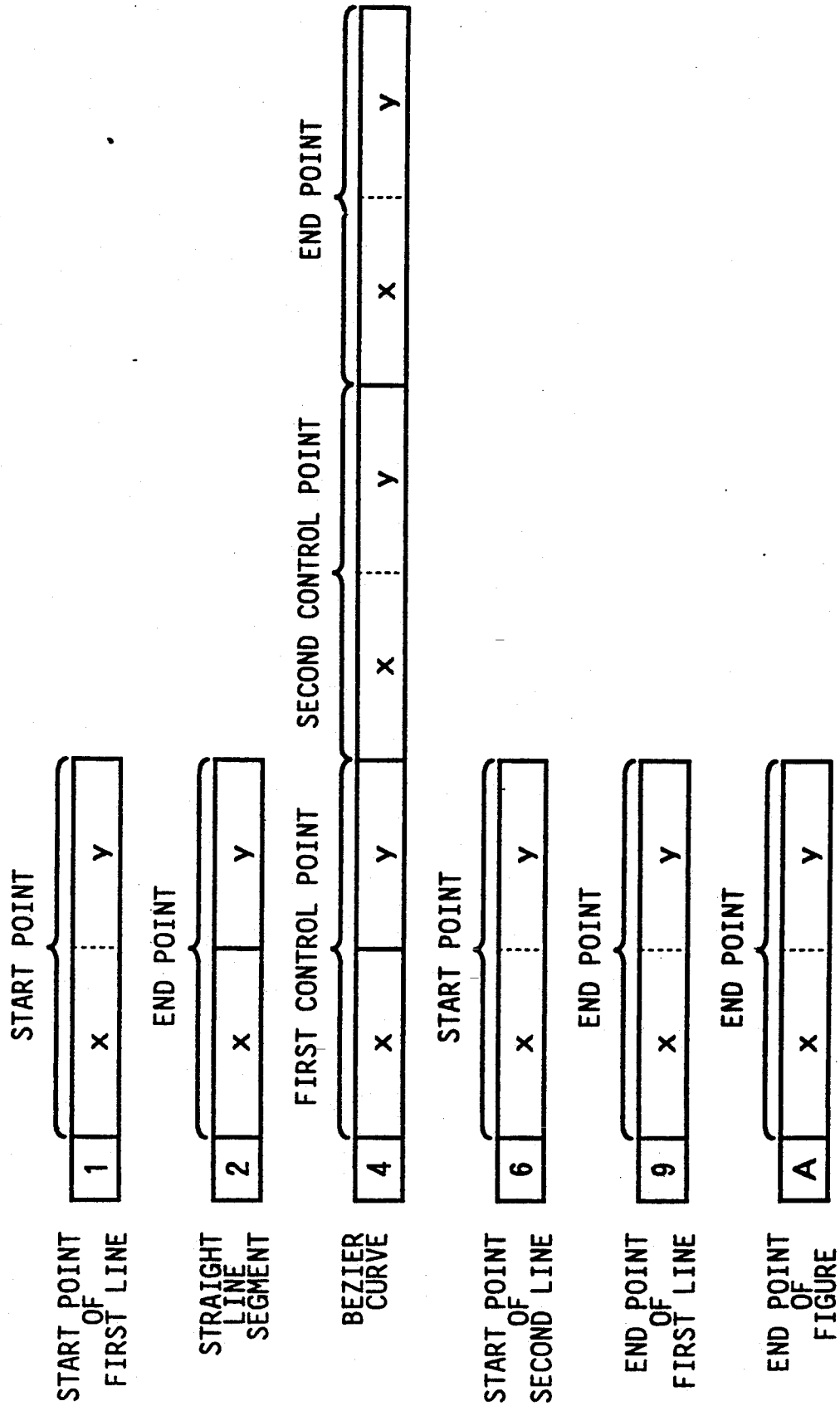
FIG. 5 is a view of different sorts of data included in outline data used in the system.

An example of original outline data is illustrated in FIG. 5, wherein the original outline data represent the outline of an embroidery area which outline is constituted by two or more closed lines. The original outline data include various sorts of elementary data. Regarding a start point of a first line as one of the two or more closed lines, the original outline data include identification data "1", and position data indicative of x and y coordinates, (x, y), of the start point. In addition, for an end point of the first line, the original outline data include identification data "9" and position data indicative of coordinates (x, y) of the end point. The coordinates (x, y) of the start point coincide with that of the end point. For a start point of a second line as another of the two or more closed lines, the original outline data include identification data "6" and position data indicative of coordinates (x, y) of the start point. It is noted that data for the start point or points of third or further ones of the two or more closed lines and data for the end point or points of the second or further lines are not shown in FIG. 5. Furthermore, for a straight line portion belonging to each closed line, the original outline data include identification data "2" and position data indicative of coordinates (x, y) of an end point of the straight line portion. A start point of a straight line portion is indicated by data for an end point of a curved or straight line portion preceding the straight line portion in question. This is true of a curved line portion belonging to each closed line. For a curved line segment or cubic Bezier curve, the original outline data include identification data "4" and position data indicative of coordinates (x, y) of each of first and second control points $Q_f$, $Q_s$ and an end point of the line segment. In the present embodiment, data defining the cubic Bezier curve function is stored in the form of a program in the ROM 22. Finally, for an end point of the outline as a whole, the original outline data include identification data "A" and position data indicative of coordinates (x, y) of the end point.

Figure 6:
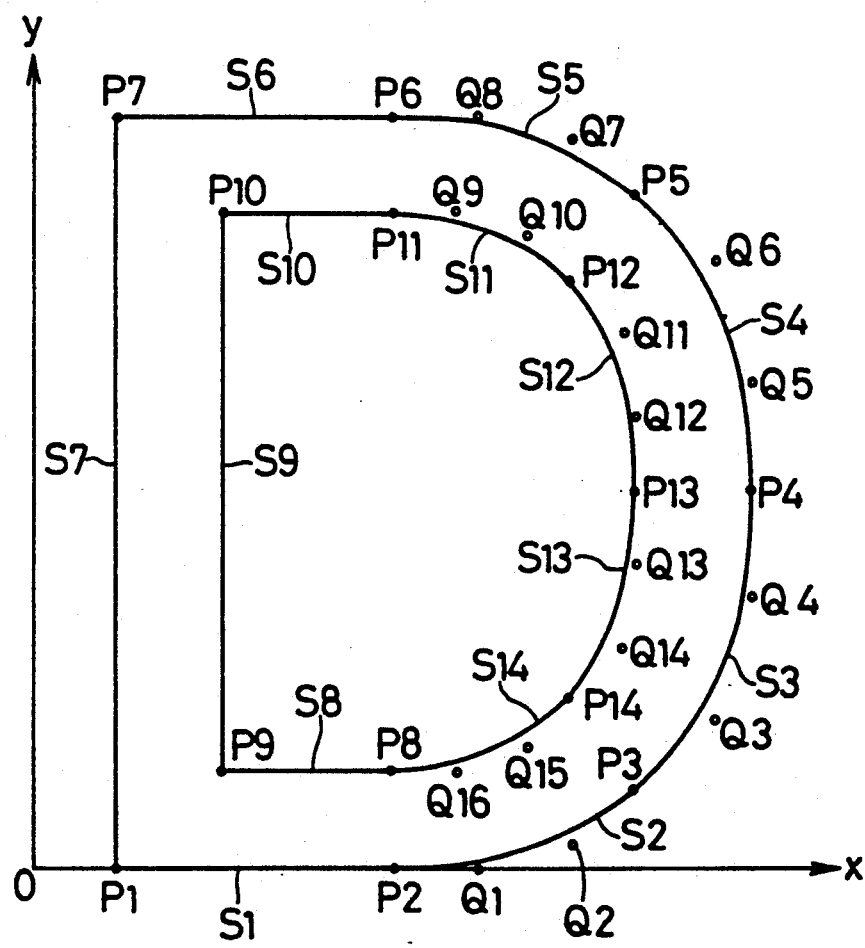
FIG. 6 is a view of a letter of "D" whose outline includes straight line portions and curved line portions.
Figure 7:
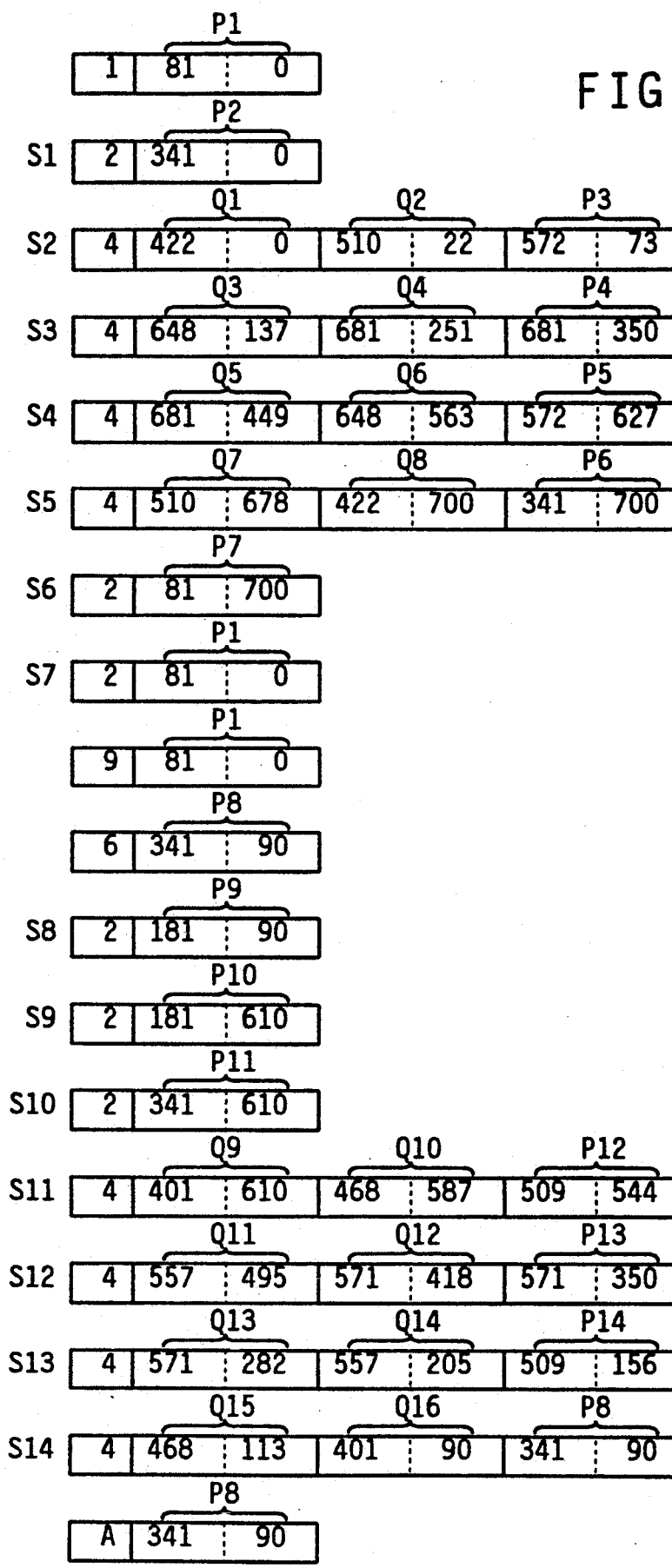
FIG. 7 is a view of outline data corresponding to letter "D" of FIG. 6, which data is used in the system.

FIG. 7 illustrates sets of elementary data belonging to the original outline data for an alphabetic letter, "D", shown in FIG. 6. The sets of elementary data are associated with symbols $S_1$ through $S_{14}$, respectively, which indicate respective straight or curved line segments of the outline of letter "D" of FIG. 6.

Referring next to the flow chart of FIG. 2, there will be described the operation of the present sewing system.

Figure 2:
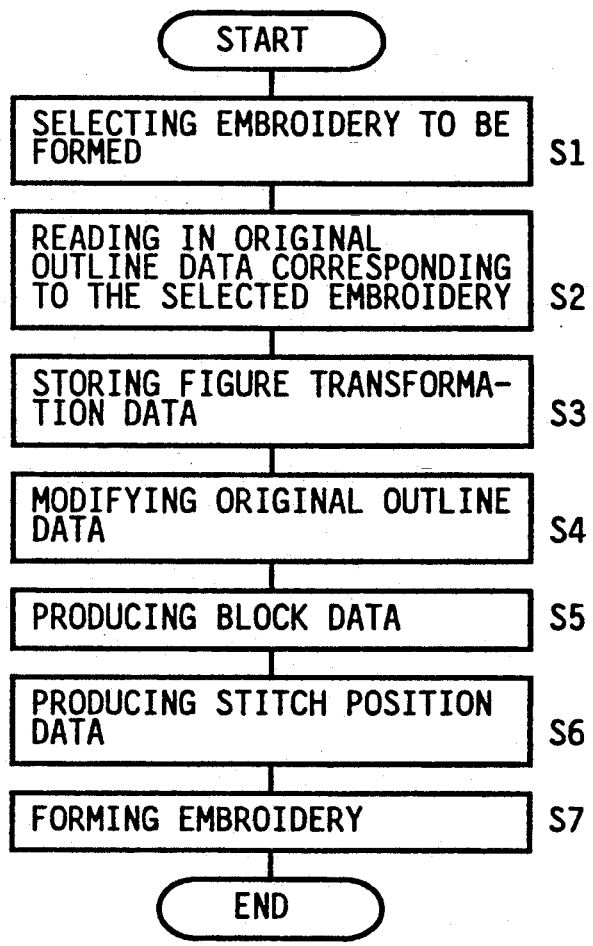
FIG. 2 is a flow chart representing an embroidering control program stored in the ROM of the system of FIG. 1.
Figure 3:
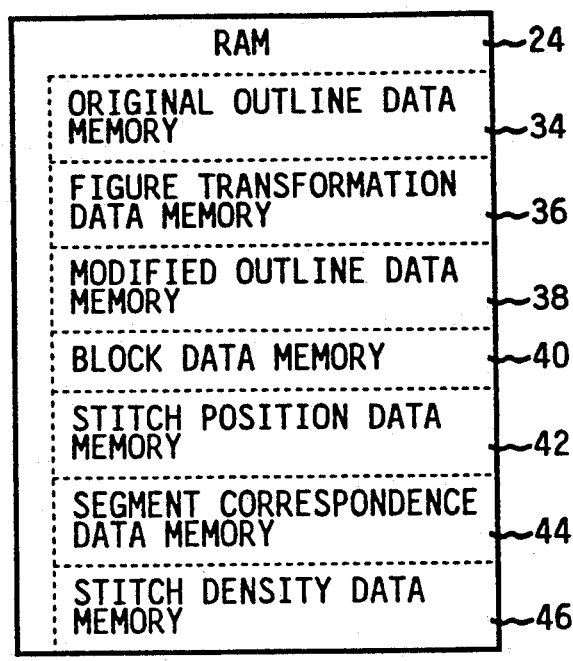
FIG. 3 is a view of memory areas of the RAM of the system.

When an embroidery to be formed is selected by operator's operation of a selection switch (not shown) on the input device 30 after electric power has been applied to the computer 18, the control of the CPU 20 begins with Step S1 of the embroidering control program represented by the flow chart of FIG. 2. In Step S1, the CPU 20 identifies a figure of outline of the selected embroidery, out of multiple figures of outline. In addition, the operator enters, through the input device 30, data indicative of a suitable density of stitch, namely, number of stitches formed per unit length. The stitch density memory 46 of the RAM 24 stores the stitch density data entered. Step S1 is followed by Step S2 to read in original outline data and segment correspondence data (described later) both of which correspond to the selected figure of outline, from the external storage device 50. The original outline data is stored in the original outline data memory 34 of the RAM 24, and the segment correspondence data is stored in the segment correspondence data memory 44.

Subsequently, the operator enters via the input device 30 data indicative of a desired figure transformation to which the selected figure of outline is subjected. For example, the operator may input data indicative of magnification or contraction of the outline, and data indicative of a rate or ratio M of magnification or contraction. If the operator wants to form the embroidery without magnification or contraction, namely, in normal or standard size, he or she may input data indicative of M=1. In Step S3, the figure transformation data is stored in the figure transformation data memory 36 of the RAM 24.

Step S3 is followed by Step S4 to read in the original outline data from the original outline data memory 34, and modify the original outline data according to the figure transformation data stored in the memory 36. Consequently, the figure of outline is transformed as desired by the operator. For example, the coordinates of each of the start and end points $P_n$ and control points $Q_n$ belonging to figure "D" of FIG. 6, are transformed according to the figure transformation data. The modified outline data is stored in the modified outline data memory 38.

Subsequently, in Step S5, the figure of outline is divided according to the segment correspondence data stored in the memory 44 of the RAM 24. The segment correspondence data include data indicative of a predetermined, suitable correspondence or combination between each of the straight or curved line segments of the outline and a straight or curved line segment of the outline which is opposed to the each straight or curved line segment in question. As a result of the division, the figure of outline is divided into one or more quadrangular blocks each of which is defined by, and between, two straight line segments opposed to each other, and/or, one or more curvilinear blocks each of which is defined by, and between, a curved line segment and an opposed straight or curved line segment. Hereinafter, the thus obtained quadrangular or curvilinear blocks are referred to as the first blocks.

Figure 8:
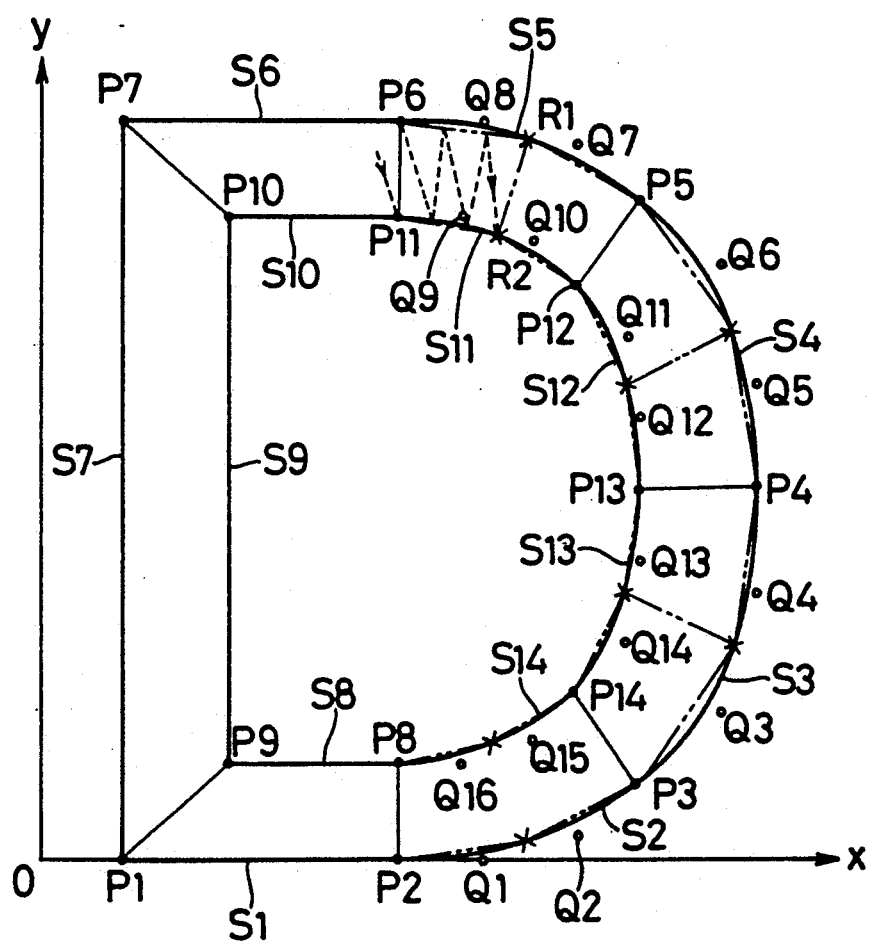
FIG. 8 is a view for explaining a manner in which the system of FIG. 1 divides letter "D" into blocks.

For example, regarding figure "D" of FIG. 6, straight line segment $S_1$ and straight line segment $S_8$ are combined with each other to define a quadrangular block as a first block; curved line segment $S_2$ and curved line segment $S_{14}$ are combined to define a curvilinear block as a first block; ... In the case where figure "D"

of FIG. 6 is divided according to the segment correspondence data associated therewith, quadrangular and curvilinear blocks are provided as shown in FIG. 8. In the figure, division lines for dividing figure "D" are indicated at solid lines each crossing the width of embroidery area "D".

In Step S5, each of the curvilinear blocks as the first blocks is divided into elementary quadrangular blocks (hereinafter, referred to as the second blocks) which cooperate with each other to approximate the each curvilinear block. Each of the elementary quadrangular blocks is defined by two straight line segments. The number of elementary quadrangular blocks obtained by dividing each curvilinear block as the first block is determined based on the desired ratio M of magnification or contraction, such that as ratio M of magnification is increased, the number of elementary rectilinear blocks obtained is increased, and that as ratio M of contraction is increased, the number of elementary rectilinear blocks obtained is decreased. For dividing a curvilinear block defined by two curved line segments each of which is defined by the cubic Bezier curve function, that is, previously indicated expressions (1), first, one or more division base points are determined on each of the two curved line segments by replacing parameter t of the expressions by respective values $1/N, 2/N, \ldots, (N-1)/N$, where N is the number of elementary quadrangular blocks to be obtained. More specifically described, by replacing variables $P_{fx}, P_{fy}, P_{sx}, P_{sy}, Q_{fx}, Q_{fy}, Q_{sx}, Q_{sy}$ of the expressions (1) by the coordinates of start and end points and two control points associated with each curved line segment in question, and replacing parameter t by each of the values, $1/N, 2/N, \ldots, (N-1)/N$, the coordinates of a corresponding one of the division base points are determined on the each curved line segment.

Figure 9:
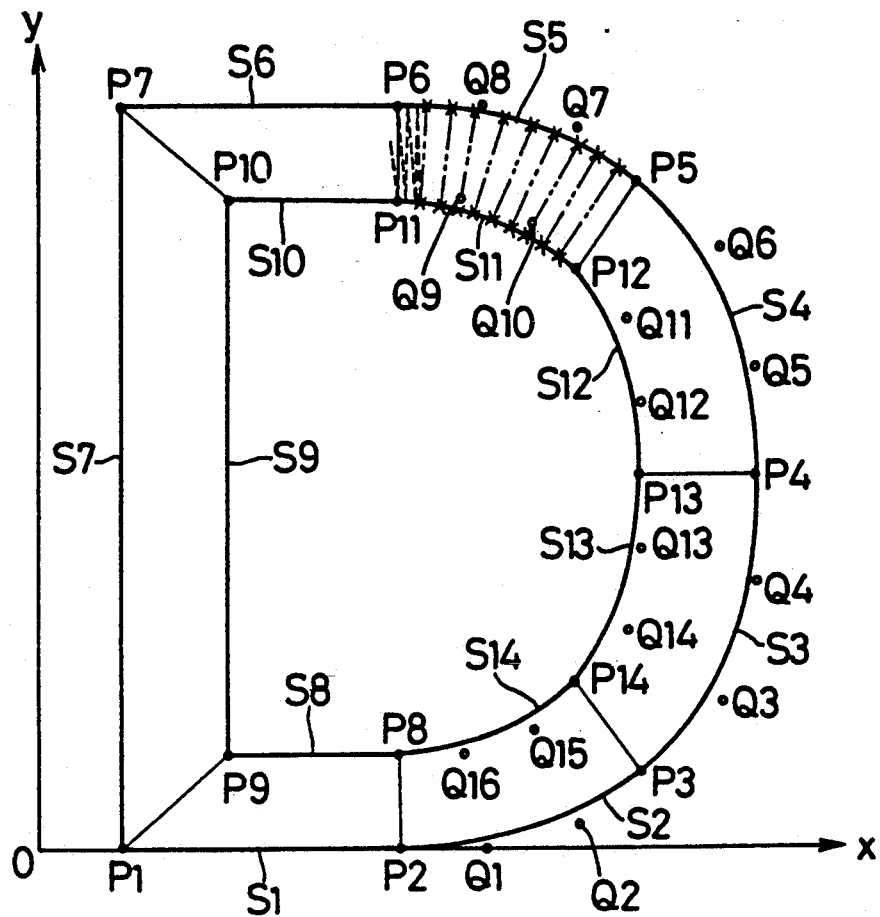
FIG. 9 is a view for explaining another manner in which the system of FIG. 1 divides letter "D" into blocks.

In the event, for example, that a curvilinear block defined by two curved line segments $S_5$, $S_{11}$ of FIG. 8 is divided into two elementary quadrangular blocks, a substantially middle point $R_1$ of segment $S_5$ connecting between points $P_6$, $P_5$ and a substantially middle point $R_2$ of segment $S_{11}$ connecting between points $P_{11}$, $P_{12}$ are specified as division base points by inserting the coordinates of points $P_6, P_5, Q_8, Q_7$, or $P_{11}, P_{12}, Q_9, Q_{10}$, into variables $P_{fx}, P_{fy}, P_{sx}, P_{sy}, Q_{fx}, Q_{fy}, Q_{sx}, Q_{sy}$ and insert a value, $\frac{1}{2}$ (=0.5), into parameter t, of the expressions (1), i.e., cubic Bezier function. Consequently, the curvilinear block in question is divided into two quadrangular blocks one of which is defined by four points $P_6, R_1, R_2, P_{11}$ and the other of which is defined by four points $P_5, P_{12}, R_2, R_1$. Similarly, the curvilinear block in question may be divided into ten elementary quadrangular blocks, as shown in FIG. 9. In Step S5, subsequently, sets of block data each representative of an outline of a corresponding one of the quadrangular blocks as the first and second blocks, are prepared, and stored in the block data memory 40. Each block data include sets of position data indicative of the four points defining a corresponding quadrangular block.

After the figure of outline of the selected embroidery has been divided into quadrangular blocks and block data for those blocks have been stored as described above, the control of the CPU 20 goes to Step S6 to read in the block data from the block data memory 40 and the stitch density data from the stitch density data memory 46 and determine stitch positions at which, respective stitches are formed to fill each of the quadrangular blocks. For example, regarding a quadrangular block defined by four points $P_6, R_1, R_2, P_{11}$, the stitch positions are determined on a first side connecting between points $P_6, R_1$ and a second side connecting between points $P_{11}, R_2$, as shown in FIG. 8, so that stitches are formed by alternately connecting with thread between the stitch positions on the first side and the stitch positions on the second side, in an embroidery direction from a third side connecting between points $P_6, P_{11}$ toward a fourth side connecting between points $R_1, R_2$. More specifically described, the stitch positions are determined by dividing a length of the first or second side by a suitable number corresponding to the stitch density desired by the operator. Sets of stitch position data indicative of the determined stitch positions are stored in the stitch position data memory 42.

Thereafter, when the operator enters an embroidering start command via the input device 30, the control goes to Step S7 to read in the stitch position data from the memory 42, and control the stitching device 12 and feeding device 14 according to the stitch position data so as to form on the workfabric the selected embroidery that has been transformed or not transformed.

As shown in FIG. 1, a communication device 56 is connected to the I/O interface 28. The communication device 56 includes a transmission channel such as telephone line, and is connected to an image reading device 60 such as a television via a first output device 58, to a personal computer system 62, and to an input device 66 such as a keyboard via a second output device 64. The first output device 58 generates data representing the image read by the image reading device 60, to the sewing machine system 10 via the communication device 56. The second output device 64 generates input data from the input device 66, to the sewing machine system 10 via the communication device 56. Another communication device 68 is connected to the personal computer system 62.

While in the present embodiment the segment correspondence data is used in addition to the original outline data, it is not essential in the present invention to use the segment correspondence data. The segment correspondence data is used for the purpose of facilitating the data processing effected by the sewing machine system 10. Therefore, it is possible to use such a control program according to which the computer 18 specifies multiple points on the outline of an embroidery that has been, or has not been, subjected to transformation, so that the specified points cooperate with each other to define a polygon approximating the outline, where the specified points serve as the vertices of the polygon, and the computer 18 divides the polygon into elementary blocks by utilizing the vertices and produce sets of block data representative of the blocks. Examples of the technique of dividing a polygon into blocks are disclosed in U.S. patent applications Ser. No. 07/592,983, U.S. Pat. No. 5,181,176 and Ser. No. 07/601,469, U.S. Pat. No. 5,191,536 each assigned to the Assignee of the present application.

It needs a longer time to produce stitch position data directly from outline data, than to produce stitch position data from block data. In the present embodiment, therefore, for minimizing the time necessary to produce stitch position data, first, outline data is used to divide the figure of outline into quadrangular blocks, then block data representing the blocks are produced, and stitch position data is prepared from the block data. Although the figure of outline is divided into quadrangular blocks and stitch position data is prepared from block data representing the quadrangular blocks, the embroidery produced according to the thus prepared stitch position data does not suffer from inappropriate burrs or indentations along the outline thereof, because each of the quadrangular blocks consists of a sufficiently small section or strip obtained by dividing a curvilinear block as the previously described first block.

In addition, in the present embodiment, in the event that another stitch position data is produced by changing the stitch density but without changing the transformation, the operator has only to change the stitch density data stored in the memory 46, because the block data stored in the memory 40 is used without any change thereto. In this case, it is not needed to produce another block data from outline data.

In the field of printers and displays, various types of letters and figures (e.g., Gothic, italic, . . . ) are used. Outline data representing the outlines of those letters and figures may be used as the original outline data in the present invention for embroidering the corresponding letters and figures. Utilizing the widely used characters and figures results in facilitating production of embroidery data.

Furthermore, since the sewing machine system 10 is connected to the printer 52 and display 54 each of which indicates the figure of outline of an embroidery to be formed, the operator can check the shape, size and location of the figure of outline in a short time and with sufficient accuracy before the embroidery is actually produced on the workfabric.

As is apparent from the foregoing description, in the present embodiment, a part of the computer 18 which serves for effecting Steps S1, S2 of the flow chart of FIG. 2, and the original outline data memory 34 cooperate with each other to provide means for storing original outline data; a part of the computer 18 which serves for effecting Steps S3, S4 of FIG. 2, and the figure transformation data memory 36 and modified outline data memory 38 cooperate with each other to provide means for modifying original outline data; and a part of the computer 18 which serves for effecting Steps S5, S6 of FIG. 2, and the block data memory 40 and stitch position data memory 42 cooperate with each other to provide means for producing embroidery data.

Figure 10:
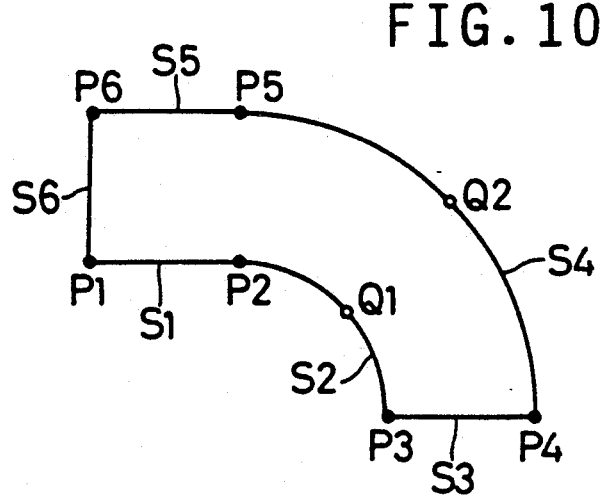
FIG. 10 is a view of outline data used in another embodiment of the system.
Figure 11:
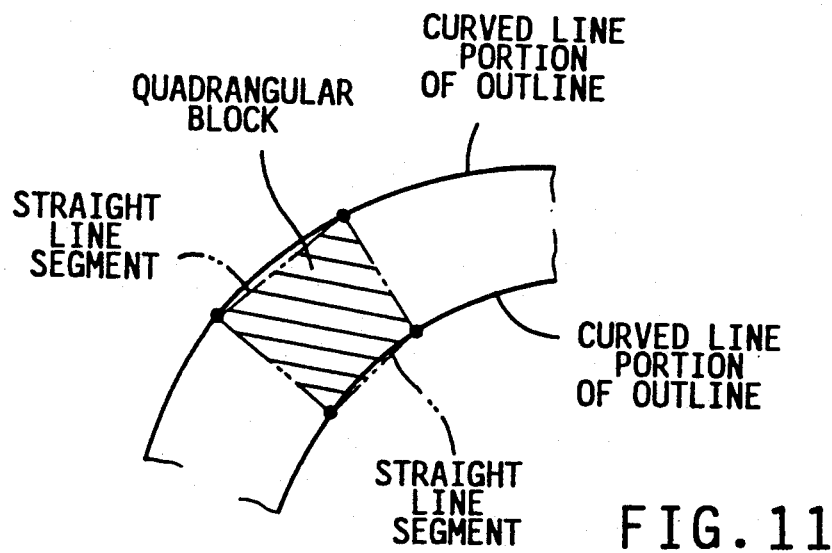
FIG. 11 is a view of an example in which a quadrangular block approximates a part of an embroidery area which part is defined by, and between, two curved line portions each belonging to the outline of the area.
Figure 12:
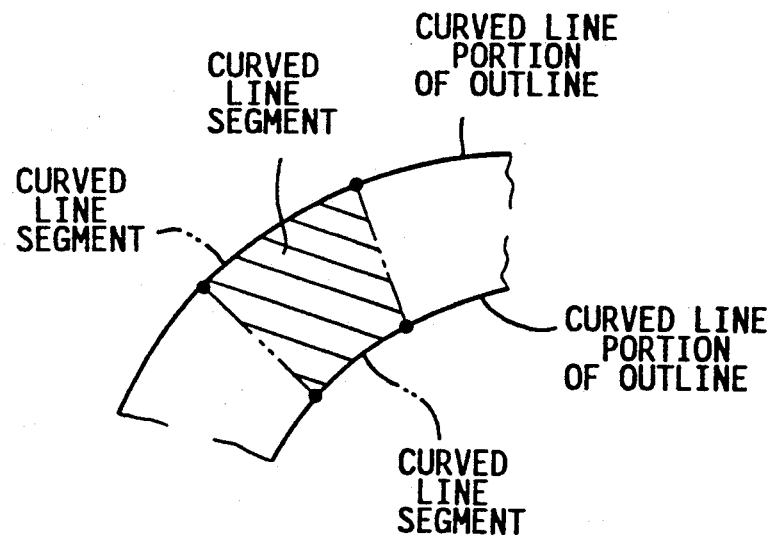
FIG. 12 is a view of an example in which a curvilinear block represents with fidelity a part of an embroidery area which part is defined by, and between, two curved line portions each belonging to the outline of the area.
Figure 13:
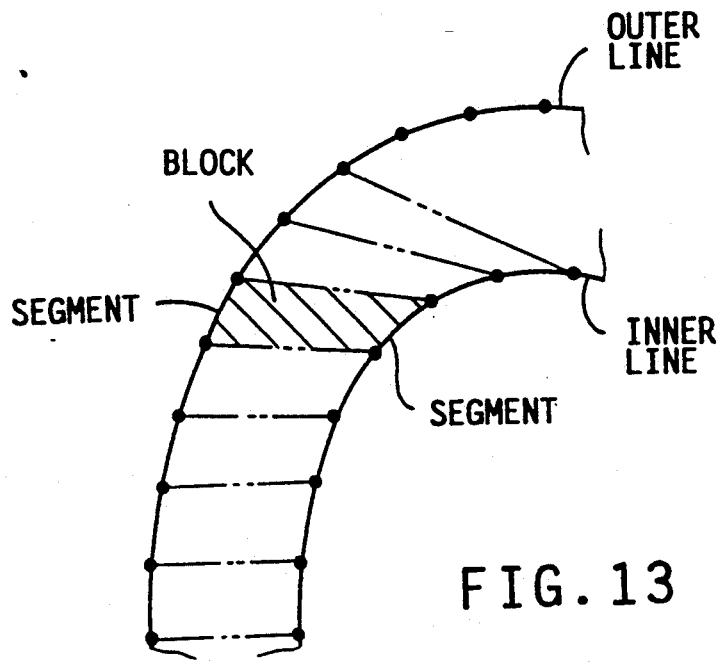
FIG. 13 is a view for explaining a manner in which letter "O" is divided into quadrangular blocks.
Figure 14:
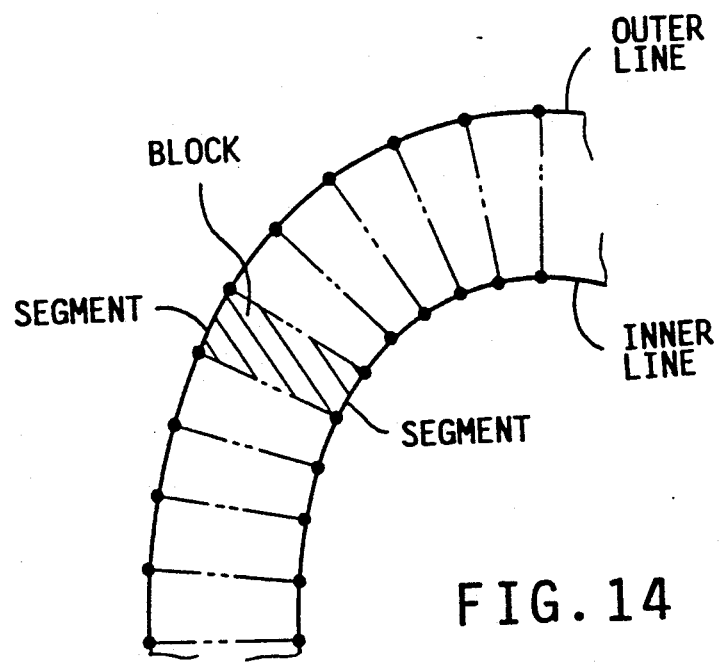
FIG. 14 is a view for explaining another manner in which letter "O" is divided into quadrangular blocks.

While in the present embodiment the cubic Bezier function is used as the curve defining function defining each of one or more curved line segments belonging to an outline, it is possible to use other functions as the curve defining function. For example, a circular function may be used to define a curved line segment in the form of an arc defined by two end points of the line segment and another point on the line segment, as shown in FIG. 10.

In the present embodiment, first, the figure of outline is divided into one or more, quadrangular blocks and/or one or more curvilinear blocks as the first blocks, subsequently each of the curvilinear blocks is divided into quadrangular blocks as the second blocks, and stitch positions are determined on the quadrangular blocks as the first and second blocks. However, it is possible to omit the step of dividing each of the curvilinear blocks into quadrangular blocks as the second blocks, namely, determine stitch positions directly on the quadrangular and curvilinear blocks as the first blocks.

While the present invention has been described in detail in its preferred embodiment, it is to be understood that the present invention is by no means limited to the details of the illustrated embodiment but may be embodied with various changes, improvements and modifications that may occur to those skilled in the art without departing from the spirit and scope of the invention defined in the appended claims.

What is claimed is:

1. An apparatus for processing embroidery data necessary for a sewing machine to form an embroidery in an area by filling the embroidery area with stitches, comprising:

storing means for storing outline data representing an outline of an embroidery area which outline includes a curved line portion, said outline data including curved line data including data indicative of a characteristic of said curved line portion; and producing means for dividing, by utilizing said outline data, a part of said embroidery area, which part is defined by, and between, said curved line portion and a line portion of said outline which is opposed to said curved line portion, into a plurality of quadrangular blocks, each of which is defined by and between a pair of opposed straight line segments, so that the pairs of opposed straight line segments of said quadrangular blocks cooperate with each other to approximate said curved line portion and said opposed line portion and so that said quadrangular blocks cooperate with each other to approximate said part of said embroidery area, (b) producing sets of quadrangular block data each of which represents an outline of a corresponding one of said quadrangular blocks and comprises four sets of point data indicative of four vertices of said corresponding one quadrangular block, an (c) producing, by utilizing said sets of quadrangular block data, said embroidery data comprising stitch position-related data specifying at least one stitch position on an intermediate portion of at least one of said pair of opposed straight line segments of said each quadrangular block, said intermediate portion excluding said vertices of said each quadrangular block.

2. The apparatus as set forth in claim 1, wherein said curved line portion consists of at least one curved line segment, said curved line data defining each of said at least one segment and including data indicative of a characteristic of said each curved line segment.

3. The apparatus as set forth in claim 2, wherein said curved line data include data indicative of a pair of end points of sadi each curved line segment, and data indicative of an expression of a function which cooperates with said end points to define an arbitrary point on said each segment.

4. The apparatus as set forth in claim 3, wherein said function is a third-order Bezier curve function which utilizes the two end points of said each curved line segment and two control points for defining said arbitrary point on said each segment.

5. The apparatus as set forth in claim 1, wherein said producing means comprises:

means for dividing said part of said embroidery area which part is defined by and between said curved line portion and said line portion of said outline which is opposed to said curved line portion, into a plurality of first blocks each of which is a curvilinear block defined by and between two line segments which belong to said curved line portion and said opposed line portion, respectively, and producing sets of first block data each of which represents the outline of a corresponding one of said first blocks; and means for dividing each of said first, curvilinear blocks into a plurality of second blocks as said quadrangular blocks, and producing sets of second block data as said sets of quadrangular block data.

6. The apparatus as set forth in claim 5, wherein said producing means further comprises means for producing, by utilizing said sets of quadrangular block data and stitch density data, sets of stitch position data indicative of respective stitch positions at which said sewing machine forms said stitches to fill each of said quadrangular blocks, said stitch positions including said at least one stitch position on sadi intermediate portion of said at least one of said pair of opposed straight line segments of said each quadrangular block.

7. The apparatus as set forth in claim 1, further comprising data utilization means for utilizing said embroidery data to form said stitches.

8. The apparatus as set forth in claim 1, wherein said sets of quadrangular block data represent said quadrangular blocks such that two vertices out of the our vertices of one block of each pair of adjacent blocks out of said quadrangular blocks are the same as two vertices out of the four vertices of the other block of said each pair of adjacent blocks.

9. An apparatus for processing embroidery data necessary for a sewing machine to form an embroidery in an area by filling the embroidery area with stitches, comprising:

storing means for storing outline data representing an outline of an embroidery area which outline includes a curved line portion, said outline data including curved line data defining said curved line portion, said curved line data including data indicative of a characteristic of said curved line portion;

modifying means for modifying said outline data and thereby transforming said outline and sadi embroidery area; and producing means for (a) dividing, by utilizing the modified outline data including the modified curved outline data representing the transformed curved line portion, a part of the transformed embroidery area, which part is defined by and said transformed curved line portion and a line portion of the transformed outline which is opposed to said transformed curved line portion, into a plurality of quadrangular blocks, each of which is defined by and between a pair of opposed straight line segments, so that the pairs of opposed straight line segments of said quadrangular blocks cooperate with each other to approximate sd transformed curved line portion and said opposed line portion and so that said quadrangular blocks cooperate with each other to approximate said part of said transformed embroidery area, (b) producing sets of quadrangular block data each of which set represents an outline of a corresponding one of said quadrangular blocks and comprises four sets of point data indicative of four vertices of said corresponding one quadrangular block, and (c) producing, by utilizing said sets of quadrangular block data, embroidery data necessary to form an embroidery inside sadi transformed outline, said embroidery data comprising stitch position-related data specifying at least one stitch position on an intermediate portion of at least one of said pair of opposed straight line segments of said each quadrangular block, said intermediate portion excluding said vertices of said each quadrangular block.

10. The apparatus as set forth in claim 9, wherein said modifying means modifies said outline data so that said outline is subjected to at least one of magnification, contraction, rotation, and parallel translation.

11. The apparatus as set forth in claim 9, wherein said curved line portion consist of at least one curved line segment, said curved line data defining each of said at least one segment and including data indicative of a characteristic of said each curved line segment.

12. The apparatus as set forth in claim 11, wherein said curved line data include data indicative of a pair of end points of sadi each curved line segment, and data indicative of an expression of a function which cooperates with said end points to define an arbitrary point on said each segment.

13. The apparatus as set forth in claim 12, wherein said function is a third-order Bezier curve function which utilizes the two end points of said each curved line segment and two control points for defining said arbitrary point on said each segment.

14. The apparatus as set forth in claim 13, wherein said modifying mans modifies coordinates of each of the two end points of said each curved line segment and said two control points associated with said each curved line segment, said producing means dividing said part of said transformed embroidery area into said quadrangular blocks, by utilizing the modified coordinates of each of said two end points and two control points and said third Bezier curve function.

15. The apparatus as set forth in claim 9, wherein said producing means comprises:

first means for dividing said part of said transformed embroidery area, which part is defined by and between said transformed curved line portion and said line portion of said outline opposed to said curved line portion, into a plurality of first blocks, each of which is a curvilinear block defined by and between two line segments which belong to said curved line portion and said opposed line portion, respectively, and producing sets of first block data each of which represents the outline of a corresponding one of said first blocks; and second means for dividing each of said first, curvilinear blocks into a plurality of second blocks as said quadrangular blocks, and producing sets of second block data as said sets of quadrangular block data.

16. The apparatus as set forth in claim 15, further comprising input means for inputting a degree of magnification or contraction of said outline data, said modifying means modifying said outline data according to the inputted degree of magnification or contraction, said second means dividing said each first block into a number of said second, quadrangular blocks which number corresponds to said inputted degree of magnification or contraction.

17. The apparatus as set forth in claim 15, wherein said producing means further comprises means for producing, by utilizing said sets of quadrangular block data and stitch density data, sets of stitch position data indicative of respective stitch positions at which said sewing machine forms said stitches to fill each of said quadrangular blocks, said stitch positions including said at least one stitch position on said intermediate portion of said at least one of said pair of opposed straight line segments of said each quadrangular block.

18. The apparatus as set forth in claim 9, further comprising data utilization means for utilizing said embroidery data to form said stitches.

19. The apparatus as set forth in claim 9, wherein said sets of quadrangular block data represent said quadrangle blocks such that two vertices out of the four vertices of one block of each pair of adjacent blocks out of said quadrangular blocks are the same as two vertices out of the four vertices of the other block of said each pair of adjacent blocks.

* * * * *